US006611312B2

(12) United States Patent
Kijima et al.

(10) Patent No.: US 6,611,312 B2

(45) Date of Patent: Aug. 26, 2003

(54) DISPLAY DEVICE INCLUDING OUTER FRAME WITH SOME NEIGHBORING WALL MEMBERS THAT ARE ENGAGED WITH EACH OTHER HAVE OBLIQUE SURFACES

(75) Inventors: Yuuichi Kijima, Chousei (JP); Shigemi Hirasawa, Chiba (JP); Hiroshi Kawasaki, Ooami (JP)

(73) Assignees: Hitachi, Ltd., Tokyo (JP); Hitachi Device Engineering Co., Ltd., Tokyo (JP)

( * ) Notice: Subject to any disclaimer, the term of this patent is extended or adjusted under 35 U.S.C. 154(b) by 11 days.

(21) Appl. No.: 10/043,192

(22) Filed: Jan. 14, 2002

(65) Prior Publication Data

US 2002/0097368 A1 Jul. 25, 2002

(30) Foreign Application Priority Data

Jan. 24, 2001 (JP) ....................................... 2001-015974

(51) Int. Cl.[7] .............................................. G02F 1/1339

(52) U.S. Cl. ....................................... 349/153; 349/156

(58) Field of Search .......................... 349/58, 153, 155, 349/156, 187, 190, 84

(56) References Cited

U.S. PATENT DOCUMENTS

2002/0171800 A1 * 11/2002 Miyazaki et al. ........... 349/156

FOREIGN PATENT DOCUMENTS

| | | |
|---|---|---|
| JP | 08-022782 | 7/1994 |
| JP | 10-302685 | 4/1997 |
| JP | 2000-021335 | 6/1998 |

* cited by examiner

*Primary Examiner*—Tarifur R. Chowdhury

(57) ABSTRACT

The present invention provides a display device which can maintain a gap between a front surface panel 1 and a back surface panel 2 at a given value and maintain the air-tightness of a sealed space defined between the front surface panel 1 and the back surface panel 2 even when the gap is relatively large. To achieve such an object, the display device includes the back surface panel 1, the front surface panel 2 and the outer frame 3, the outer frame 3 is constituted of a plurality of divided wall members 3X1, 3X2, 3Y1, 3Y2 and 3C1 to 3C4. Further, at least at some portions where neighboring wall members are engaged with each other, oblique surfaces 3P are formed and a crossing angle which is made by a normal line of the oblique surfaces 3P and a normal line of the back surface panel 1 or the front surface panel 2 is set to an acute angle.

11 Claims, 6 Drawing Sheets

FIG. 2A FIG. 2B
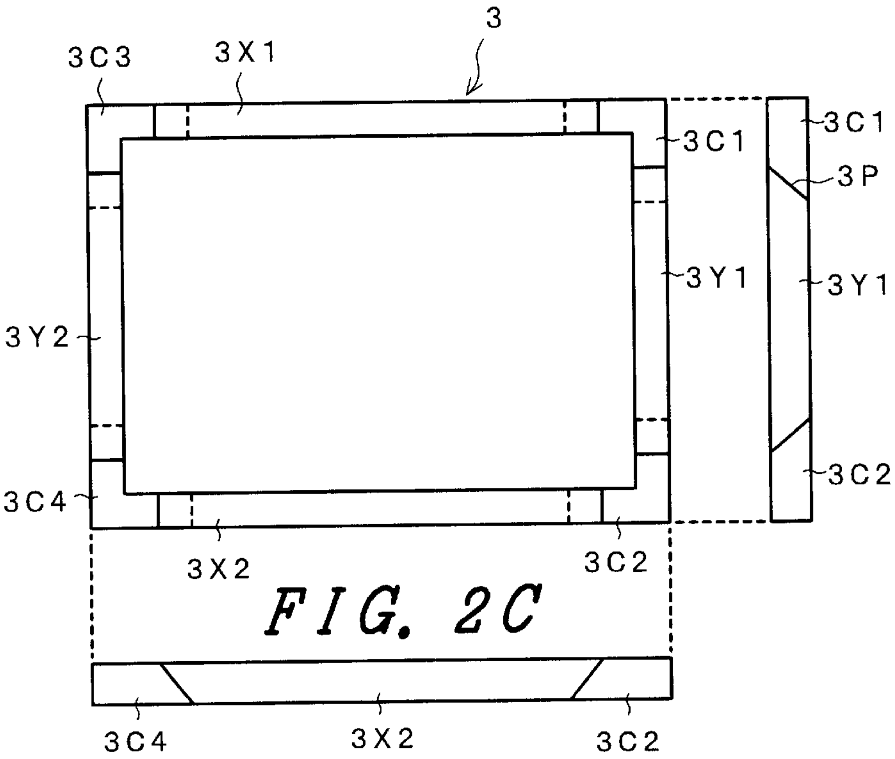
FIG. 2C
FIG. 3A FIG. 3B
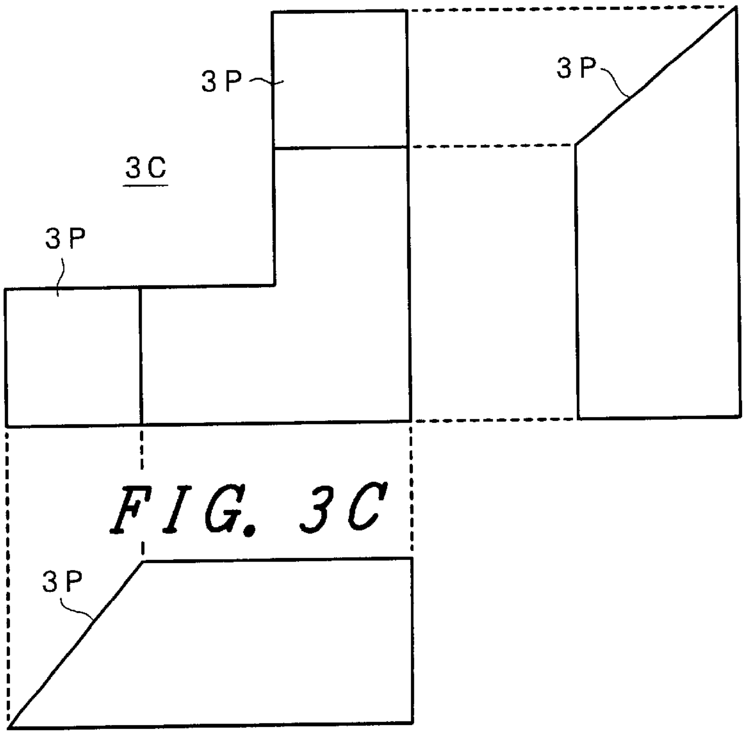
FIG. 3C

DISPLAY DEVICE INCLUDING OUTER FRAME WITH SOME NEIGHBORING WALL MEMBERS THAT ARE ENGAGED WITH EACH OTHER HAVE OBLIQUE SURFACES

BACKGROUND OF THE INVENTION

1. Field of the Invention

The present invention relates to a display device, and more particularly, to a flat-face panel display device which sets the pressure in a sealed space defined in the inside of display device lower than the outside pressure.

2. Description of the Related Art

As a display device which exhibits high brightness and high definition, a color cathode ray tube has been widely used. However, along with the progress in the field of information processing equipment and to realize the high quality television broadcasting, the demand for a flat-plate-like display (panel display) which exhibits excellent characteristics such as high brightness and high definition, is light-weighted and can minimize the space has been increasing.

As typical examples, liquid crystal display devices, plasma display devices or the like have been commercialized. Particularly, as display devices which can further enhance high brightness, panel-type display devices of various types such as field emission displays (also referred to as "FEDs" hereinafter) or organic EL displays which are characterized by the low power consumption are expected to be commercialized soon.

Among such panel-type display devices, in a display device which makes a sealed space defined between two panels consisting of a front surface panel and a back surface panel have pressure lower than the ambient atmospheric pressure or a vacuum state, it is necessary to hold a gap between these two panels at a given value and to maintain the air-tightness of the sealed space. To form the sealed space in the gap defined between two opposing panels, it is necessary to insert spacers between inner walls of peripheries of both panels. These spacers may be obtained by coating an adhesive agent (such as a frit glass or the like) using a dispenser, a multiple printing or the like. However, when the gap between both panels is large, it is difficult for the spacers having such a constitution to maintain a given gap since the adhesive agent flows and is deformed. On the other hand, the multiple printing is time consuming.

For example, with respect to the FED having the large gap between both substrates, glass plates are used as the panel material and the gap of the sealed space defined between these glass plates (the front surface panel and the back surface panel) is approximately 1 mm or more. The above-mentioned gap can be formed by fixedly securing the front surface panel and the back surface panel with the outer frame using the adhesive agent.

FIG. 6 is a schematic cross-sectional view for explaining a constitutional example of a field emission display device (FED) as an example of the panel display device of this type. In this field emission display device, peripheral inner walls of a back surface panel 1 and a front surface panel 2 are fixedly secured to each other by means of an outer frame 3, thus forming a sealed space which is at a reduced pressure or is evacuated in the inside surrounded by the outer frame 3. The thickness of the outer frame 3 is set to approximately 1 mm and is fixedly secured to the back surface panel 1 and the front surface panel 2 using an adhesive agent 4.

A cathode electrode 5, an insulation layer 6 and a grid electrode 7 are formed on an inner surface of the back surface panel 1, while an anode electrode 8 and a phosphor 9 are formed on an inner surface of the front surface panel 2. The cathode electrode 5 and the phosphor 9 form a pair and constitute one pixel. In case of a color display, one color pixel is constituted of a group made of three neighboring different phosphors which irradiate lights of different colors (generally, red, green and blue). Here, a partition wall 10 made of insulation material is disposed between respective pixels.

In the FED of this type, electron beams irradiated from the cathode electrode 5 are controlled in response to image information applied to the grid electrode 7 and impinge on the phosphor 9 laminated on the anode electrode 8 thus generating given colors.

FIG. 7 is a developed perspective view for schematically explaining a conventional constitutional example of the back surface panel, the front surface panel and the outer frame shown in FIG. 6. The outer frame 3 which is interposed between the back surface panel 1 and the front surface panel 2 is formed of an integral or unitary frame. By coating adhesive agents 3*a*, 3*b* which are preferably made of frit glass on respective surfaces of the outer frame 3 which face the inner surfaces of the back surface panel 1 and the front surface panel 2 in an oppose manner using suitable means such as printing or the like, the back surface panel 1 and the front surface panel 2 are fixedly secured to each other thus forming an inner space which constitutes the sealed space which is at a reduced pressure or in a vacuum state.

As literatures which disclose the display devices of this type, Japanese Laid-open Publication 21335/2000, Japanese Laid-open Publication 22782/1996 and the like can be named.

In the above-mentioned prior art, with respect to the display device which adheres and fixedly secures two glass plates using the outer frame, when the display device becomes large-sized, the display device is liable to be broken during handling thereof and this causes waste in processing the material used for the display thus pushing up the manufacturing cost.

To obviate such a problem, a technique which divides the outer frame into a plurality of members and then assembles and adhere these members each other may be considered. However, in such a technique, after adhering, a leaking of the inner pressure is liable to occur at portions where these members are adhered to each other so that it is difficult to maintain the air-tightness. Accordingly, it has been a task of the present invention to solve such a problem.

SUMMARY OF THE INVENTION

Accordingly, it is an object of the present invention to provide a display device which can solve the above-mentioned task of the prior art and can maintain the air-tightness of a sealed space while holding a gap between two glass plates at a given value even when the gap is large.

To achieve the above-mentioned object, the present invention provides a display device comprising a front surface panel, a back surface panel and an outer frame, wherein the front surface panel, the back surface panel and the outer frame are fixedly secured to each other by an adhesive agent, and a sealed space formed in the inside surrounded by the front surface panel, the back surface panel and the outer frame is set at a pressure lower than the outside pressure, the improvement being characterized in that the outer frame is comprised of a plurality of wall members and portions of at least some neighboring wall members which are engaged with each other have oblique surfaces at least partially, a crossing angle made by a normal line of the oblique surfaces and a normal line of the front surface panel or the back surface panel is set to an acute angle, and both oblique surface portions which are engaged with each other are fixedly secured to each other by way of the adhesive agent inserted therebetween.

Due to such a constitution, in the sealing step, the adhesive agent is coated on the oblique surface portions of the outer frames which are engaged with each other, pressure is applied to the oblique surface portions in the direction toward the front surface panel and the back surface panel, and the adhesive agent is melt by heating the adhesive agent at a high temperature. In this case, since the crossing angle made by the normal line of the above-mentioned oblique surface and the normal line of the front surface panel or the back surface panel is set to an acute angle so that a state in which the pressure is applied to both oblique surface portions is realized. Accordingly, the adhesive agent inserted between these oblique portions can be generally easily extended so that the reliable sealing is obtained. Accordingly, the leaking of the inner pressure hardly occurs so that the air tightness of the sealed space can be maintained. To the contrary, in case that the portions of the outer frames which are engaged with each other have no oblique surface portions and are set perpendicular to the front surface panel and the back surface panel, even when an adhesive agent is coated between the engaging portions and pressure is applied to these engaging portions in the direction toward the front surface panel and the back surface panel, since the pressure is not applied to the engaging portions and the adhesive agent, the adhesive agent is not smoothly extended over the entire area of the engaging portions. Accordingly, there arises a possibility that a gap is formed between the engaging portions thus accelerating the leakage of the inner pressure.

Further, when the sealed space is set at a pressure lower than the pressure of the outer atmosphere or a vacuum is produced in the sealed space, the oblique surfaces which are engaged with each other respectively receive the pressure from the back-surface-panel side and the front-surface-panel side and hence, the leaking of the inner pressure hardly occurs at the engaging portions whereby the air-tightness of the sealed space is maintained.

Still further, it is preferable to protrude the adhesive agent from an interface of the oblique portions which are engaged with each other since this makes the leaking of the inner pressure more difficult.

The sealed space at a reduced pressure may preferably be evacuated.

It is preferable that the wall members are formed of material which is equal to material of the front surface panel or the back surface panel or are formed of glass material. Further, it is preferable that the adhesive agent is formed of frit glass.

The present invention is particularly effective when it is applied to a FED which mounts field emission elements on a back surface panel and sets a gap defined between a front surface panel and the back surface panel to not less than 1 mm.

Further, it is preferable that each wall member has the oblique surfaces at both ends thereof, wherein one of the oblique surfaces formed at both ends is formed of an oblique surface which is directed toward the front surface panel and the other of the oblique surfaces at both ends is formed of an oblique surface which is directed to the back surface panel.

Further, each wall member may have the oblique surfaces at both ends thereof and both oblique surfaces at both ends may be formed of oblique surfaces which are directed to the front surface panel or both oblique surfaces at both ends may be formed of oblique surfaces which are directed to the back surface panel.

Both oblique surface portions which are engaged with each other may have a recess and a protrusion which are engaged with each other at least at a portion of the oblique surface portions.

It is needless to say that the present invention is not limited to the above-mentioned constitutions and constitutions which will be explained later and various modification may be made without departing from the technical concept of the present invention.

BRIEF DESCRIPTION OF THE DRAWINGS

FIG. 1A to FIG. 1B are explanatory views showing the first embodiment of a display device according to the present invention, wherein FIG. 1A is a developed perspective view for schematically explaining a constitutional example of a back surface panel, a front surface panel and an outer frame and FIG. 1B is an explanatory view showing the shape of an oblique surface formed on the outer frame.

FIGS. 2A to 2C constitute trihedral views showing a plan and two side faces of the outer frame in the first embodiment of the present invention, wherein FIG. 2A is a plan view, FIG. 2B is a short-side side view and FIG. 2C is a long-side side view.

FIGS. 3A to 3C constitute trihedral views for explaining the detailed constitution of a corner wall member which constitutes the outer frame in the first embodiment of the present invention, wherein FIG. 3A is a plan view, FIG. 3B is a short-side side view and FIG. 3C is a long-side side view.

FIGS. 9A to 9C constitute trihedral views showing a plan and two side faces of the outer frame in the fourth embodiment of the present invention, wherein FIG. 9A is a plan view, FIG. 9B is a short-side side view and FIG. 9C is a long-side side view.

DESCRIPTION OF THE PREFERRED EMBODIMENTS

Preferred embodiments of the present invention are explained in detail in conjunction with drawings which show such embodiments hereinafter. Here, although the invention will be explained with respect to the embodiments which are applied to an FED, the present invention is applicable to other similar or analogous equipment in the same manner.

Figure 1A:
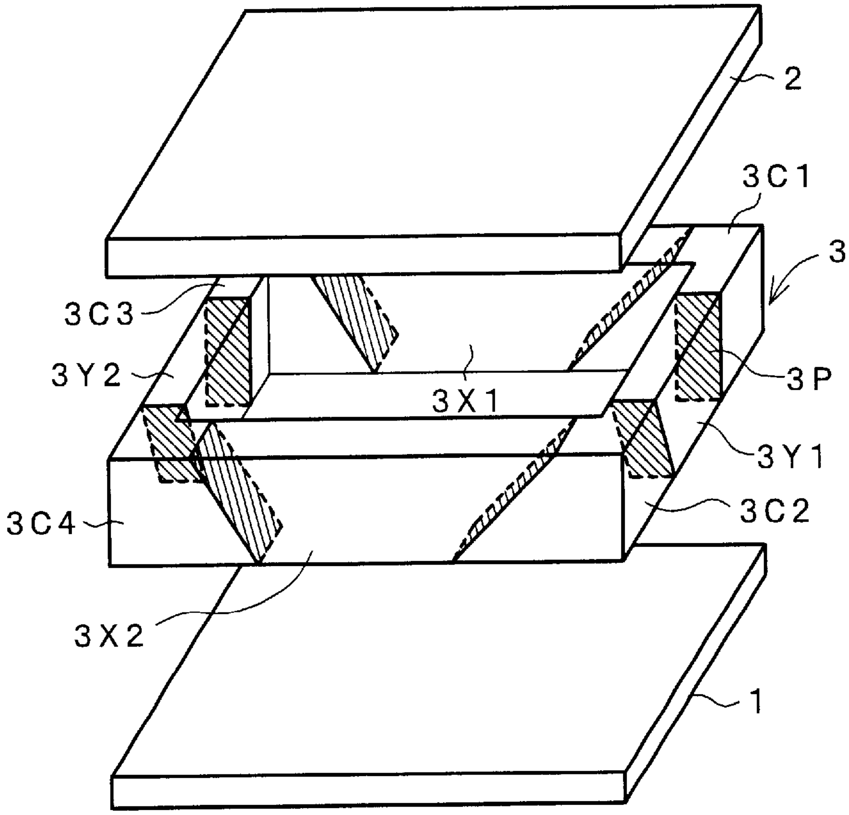
Figure 1B:
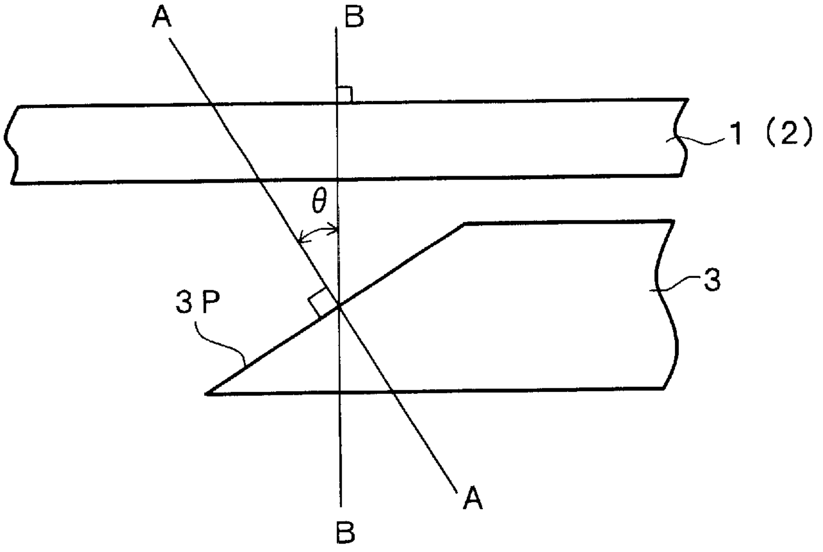

FIG. 1A and FIG. 1B are explanatory views showing the first embodiment of a display device according to the present invention, wherein FIG. 1A is a developed perspective view for schematically explaining a constitutional example of a back surface panel, a front surface panel and an outer frame and FIG. 1B is an explanatory view showing the shape of an oblique surface formed on the outer frame.

In such a display device, the back surface panel 1 and the front surface panel 2 are constituted of glass plates and the outer frame 3 is formed of glass material. Here, various constitutional elements which are formed on respective inner surfaces of the back surface panel 1 and the front surface panel 2 are omitted from the drawing.

In FIG. 1A, the outer frame 3 which has a given thickness is interposed between the peripheries of the back surface panel 1 and the front surface panel 2 and these panels 1, 2 are fixedly secured to each other with a suitable gap therebetween by means of an adhesive agent thus forming a sealed space in the inside thereof as shown in FIG. 1A. The outer frame 3 is divided into a plurality of wall members 3X1, 3X2, 3Y1, 3Y2 and 3C1 to 3C4.

With respect to respective wall members 3X1, 3X2, 3Y1, 3Y2 and 3C1 to 3C4, at portions where neighboring wall members are engaged with each other, oblique surfaces 3P are formed. As shown in FIG. 1B, a crossing angle θ made between a normal line A—A standing on the oblique surface 3P and a normal line B—B standing on the back surface panel 1, or the front surface panel 2 is set to an acute angle.

FIGS. 2A to 2C constitute trihedral views showing a plan and two side faces of the outer frame in FIG. 1A to FIG. 1B, wherein FIG. 2A is a plan view, FIG. 2B is a short-side side view and FIG. 2C is a long-side side view. Symbols in these drawings indicate parts which are identical to parts shown in FIGS. 1A to 1B.

As shown in FIGS. 2A to 2C, an outer frame 3 of this embodiment is divided into two long-side wall members 3X1 and 3X2, two short-side wall members 3Y1 and 3Y2, and four corner wall members 3C1, 3C2, 3C3, 3C4.

It is unnecessary that the dividing portions adopt the left-and-right symmetry or the up-and-down symmetry. For example, when an exhaust pipe is mounted on the outer frame for performing the vacuum suction, the dividing positions may be selected taking the mounting position of the exhaust pipe into account.

With respect to these wall members, at portions where neighboring wall members are engaged with each other, oblique surfaces 3P which have the angle explained in FIG. 1B are formed. Frit glass is inserted between these engaging oblique surfaces 3P so that the neighboring wall members are fixedly secured to each other by adhesion.

FIGS. 3A to 3C constitute trihedral views for explaining the detailed constitution of a corner wall member which constitutes the outer frame in this embodiment, wherein FIG. 3A is a plan view, FIG. 3B is a short-side side view and FIG. 3C is a long-side side view. Symbols in these drawings indicate parts which are identical with parts shown in FIG. 1A and 1B.

It is needless to say that the outer frame 3 is fixedly secured to the back surface panel 1 and the front surface panel 2 using frit glass which is similar to the above-mentioned frit glass so that the back surface panel 1, the front surface panel 2 and the outer frame 3 are integrally sealed to each other thus forming a sealed space in the inside thereof.

Although not shown in the drawing, the sealed space is subjected to the reduced pressure treatment or the vacuum treatment during the manufacturing steps of the display device.

According to this embodiment, in the sealing step, the adhesive agent is coated on the oblique surface portions of the outer frames which are engaged with each other, pressure is applied to the oblique surface portions in the direction toward the front surface panel and the back surface panel, and the adhesive agent is melt by heating at a high temperature. In this case, since the crossing angle made by the normal line of the above-mentioned oblique surface and the normal line of the front surface panel or the back surface panel is set to an acute angle so that a state in which the pressure is applied to both oblique surface portions is realized. Accordingly, the adhesive agent inserted between these oblique portions is generally liable to be extended so that the reliable sealing is obtained. Accordingly, the leaking of the inner pressure hardly occurs so that the air tightness of the sealed space can be maintained.

To the contrary, in case that the portions of the outer frames which are engaged with each other have no oblique surface portions and are set perpendicular to the front surface panel and the back surface panel, even when an adhesive agent is coated between the engaging portions and pressure is applied to these engaging portions in the direction toward the front surface panel and the back surface panel, since the pressure is not applied to the engaging portions and the adhesive agent, the adhesive agent is not smoothly extended over the entire area of the engaging portions. Accordingly, there arises a possibility that a gap is formed between the engaging portions thus accelerating the leaking of the inner pressure.

Further, when the sealed space is set at a pressure lower than that of the external atmosphere or a vacuum is produced in the sealed space, both of the above-mentioned engaging oblique surfaces respectively receive pressure from the back surface panel side and the front surface panel side so that the leaking of the inner pressure is hardly generated at the engaging portions whereby the air-tightness of the sealed space can be maintained.

Further, since the outer frame is constituted of a plurality of wall members, there is no waste in cutting material used as the outer frame so that an inexpensive display device can be obtained as a whole.

Figure 4:
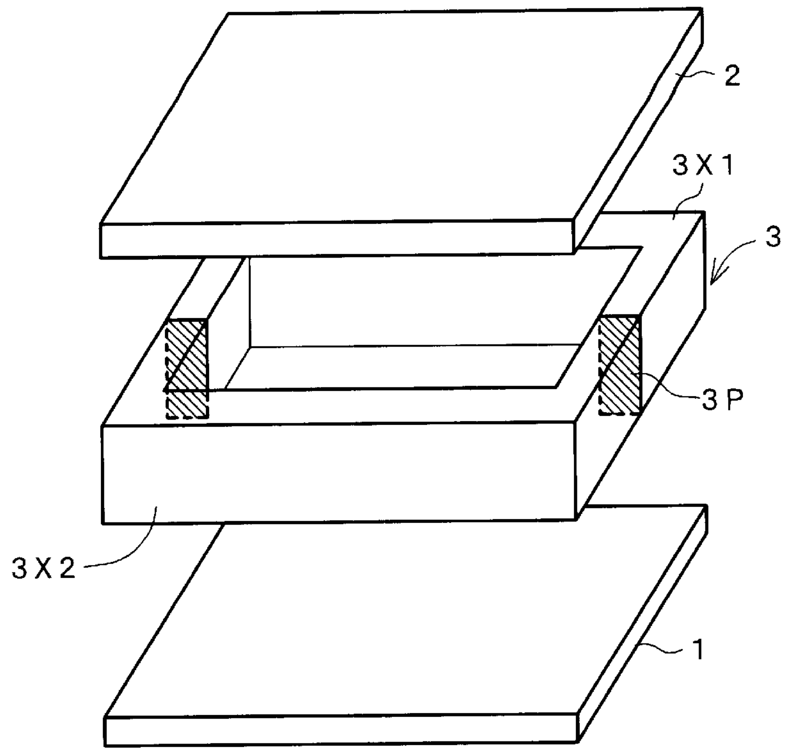
FIG. 4 is an explanatory view of the second embodiment of the display device according to the present invention.

FIG. 4 is an explanatory view of the second embodiment of the display device according to the present invention. This embodiment is characterized in that an outer frame 3 which is similar to the outer frame of the first embodiment shown in FIG. 1A to FIG. 1B is divided into two long-side wall members 3X1, 3X2.

Although dividing portions are set at center portions of the short sides, it is unnecessary to set the dividing portions at the center of the short sides. Further, it is also unnecessary to set the dividing portions to the left-and-right symmetry. For example, when an exhaust pipe is provided to the outer frame to enable the vacuum suction, the positions of the dividing portions maybe selected taking the mounting position of the exhaust pipe into account.

Oblique surfaces 3P are formed on the respective neighboring portions of the respective wall members 3X1, 3X2 which are engaged with each other. A crossing angle θ which is made by a normal line standing on the oblique surface 3P and a normal line standing on the back surface panel 1 or the front surface panel 2 is set to an acute angle.

Frit glass is interposed between these engaging oblique surfaces so as to fixedly secure these oblique surfaces by adhesion. The outer frame 3 is adhered to the back surface panel 1 and the front surface panel 2 using frit glass similar to the above-mentioned frit glass. Accordingly, the back surface panel 1, the front surface panel 2 and the outer frame 3 are integrally formed thus defining a sealed space in the inside thereof.

This sealed space is subjected to the reduced pressure treatment or the vacuum treatment in the manufacturing process of the display devices in the same manner as the first embodiment.

According to this embodiment, in the sealing step, the adhesive agent is coated on the oblique surface portions of the outer frame which are engaged with each other, the pressure is applied to the oblique surface portions in the directions toward the front surface panel and the back surface panel, the outer frame is heated at a high temperature so as to melt the adhesive agent. In this case, since the crossing angle made by the normal line of the oblique surface and the normal line of the front surface panel or the back surface panel is set to an acute angle, the state that the pressure is applied to both oblique surface portions is obtained so that the adhesive agent which is interposed between the oblique surface portions can be easily extended over the entire area whereby the reliable sealing is obtained. Accordingly, the leaking of the inner pressure hardly occurs so that the air-tightness of the sealed space can be maintained.

To the contrary, in case that the portions of the outer frames which are engaged with each other have no oblique surface portions and are set perpendicular to the front surface panel and the back surface panel, even when an adhesive agent is coated between the engaging portions and pressure is applied to these engaging portions in the direction toward the front surface panel and the back surface panel, since the pressure is not applied to the engaging portions and the adhesive agent, the adhesive agent is not smoothly extended over the entire area of the engaging portions. Accordingly, there arises a possibility that a gap is formed between the engaging portions thus accelerating the leaking of the inner pressure.

Further, when the sealed space is set at a pressure lower than that of the external atmosphere or a vacuum is produced in the sealed space, both of the above-mentioned engaging oblique surfaces respectively receive pressure from the back surface panel side and the front surface panel side so that the leaking of the inner pressure is hardly generated at the engaging portions whereby the air-tightness of the sealed space can be maintained.

Further, since the outer frame is constituted of a plurality of wall members, there is no waste in cutting material used as the outer frame so that an inexpensive display device is obtained as a whole.

Although the case in which the short sides are divided has been explained with respect to this embodiment, there arises no problem even when the long sides are divided.

Figure 5:
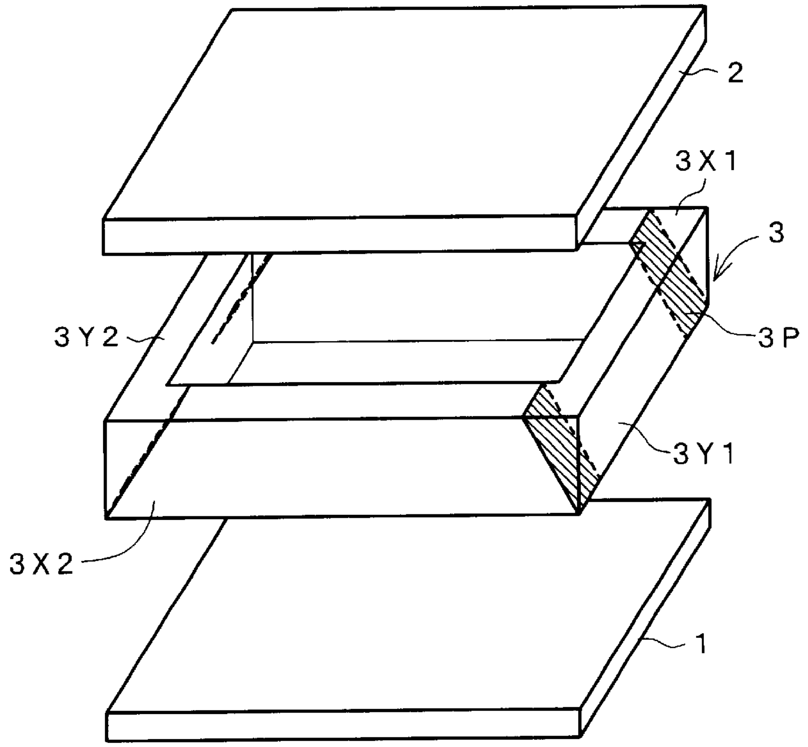
FIG. 5 is an explanatory view of the third embodiment of the display device according to the present invention.
Figure 6:
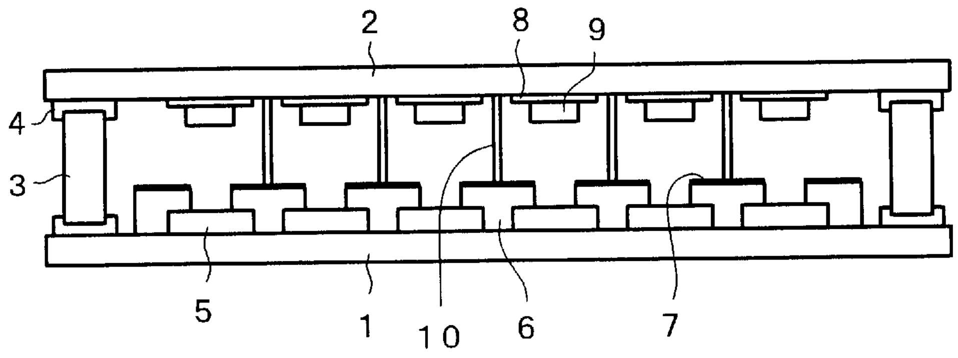
FIG. 6 PRIOR ART
FIG. 6 is a schematic cross-sectional view for explaining a constitutional example of a field emission display (FED) as an example of a panel-type display device.
Figure 7:
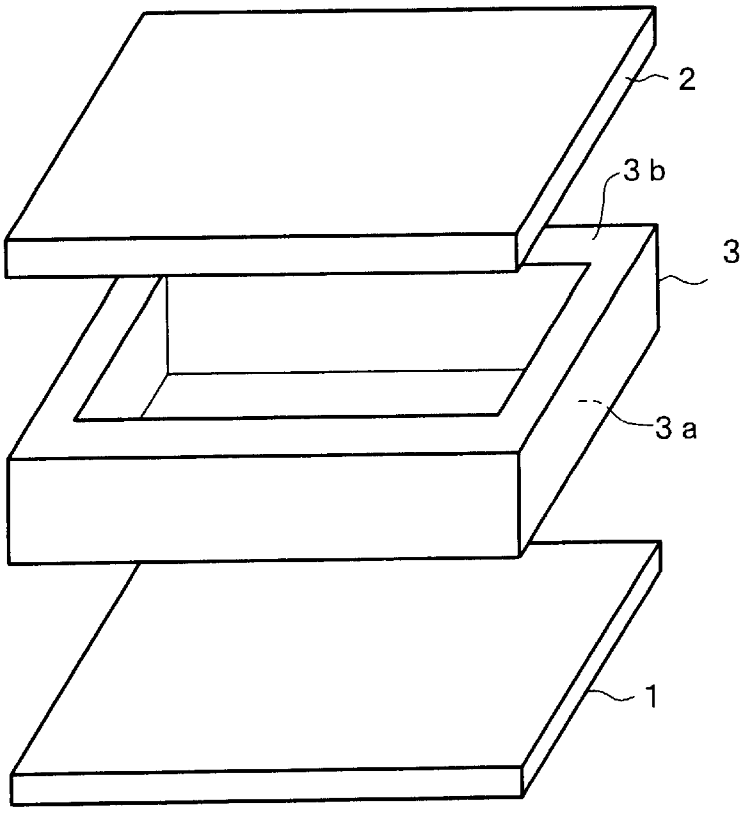
FIG. 7 PRIOR ART
FIG. 7 is a developed perspective view for schematically explaining a conventional constitutional example of a back surface panel, a front surface panel and an outer frame in FIG. 6.

FIG. 5 is an explanatory view of the third embodiment of the display device according to the present invention. This embodiment is characterized in that an outer frame 3 which is similar to the outer frame 3 which has been explained with respect to FIG. 1A to FIG. 1B and FIG. 4 is divided at four corner portions thus producing two long-side wall members 3X1, 3X2 and two short-side wall members 3Y1, 3Y2.

Oblique surfaces 3P are formed on the respective neighboring portions of the respective wall members 3X1, 3X2 and respective wall members 3Y1 and 3Y2 which are engaged with each other. A crossing angle which is made by a normal line standing on the oblique surface 3P and a normal line standing on the back surface panel 1 or the front surface panel 2 is set to an acute angle.

Frit glass is interposed between these engaging oblique surfaces so as to fixedly secure these oblique surfaces by adhesion. The outer frame 3 is adhered to the back surface panel 1 and the front surface panel 2 using frit glass similar to the above-mentioned frit glass. Accordingly, the back surface panel 1, the front surface panel 2 and the outer frame 3 are integrally formed thus defining a sealed space in the inside thereof.

This sealed space is subjected to the reduced pressure treatment or the vacuum treatment in the manufacturing process of the display devices in the same manner as the first and second embodiments.

According to this embodiment, in the sealing step, the adhesive agent is coated on the oblique surface portions of the outer frame which are engaged with each other, the pressure is applied to the oblique surface portions in the directions toward the front surface panel and the back surface panel, and the outer frame is heated at a high temperature so as to melt the adhesive agent. In this case, since the crossing angle made by the normal line of the oblique surface and the normal line of the front surface panel or the back surface panel is set to an acute angle, the state that the pressure is applied to both oblique surface portions is obtained so that the adhesive agent which is interposed between the oblique surface portions can be easily extended over the entire area whereby the reliable sealing is obtained. Accordingly, the leaking of the inner pressure hardly occurs so that the air-tightness of the sealed space can be maintained.

To the contrary, in case that the portions of the outer frames which are engaged with each other have no oblique surface portions and are set perpendicular to the front surface panel and the back surface panel, even when an adhesive agent is coated between the engaging portions and pressure is applied to these engaging portions in the direction toward the front surface panel and the back surface panel, since the pressure is not applied to the engaging portions and the adhesive agent inserted between the engaging portions, the adhesive agent is not smoothly extended over the entire area of the engaging portions. Accordingly, there arises a possibility that a gap is formed between the engaging portions thus accelerating the leaking of the inner pressure.

Further, when the sealed space is set at a pressure lower than that of the external atmosphere or a vacuum is produced in the sealed space, both of the above-mentioned engaging oblique surfaces respectively receive pressure from the back surface panel side and the front surface panel side so that the leaking of the inner pressure is hardly generated at the engaging portions whereby the air-tightness of the sealed space can be maintained.

Further, since the outer frame is constituted of a plurality of wall members, there is no waste in cutting material used as the outer frame so that an inexpensive display device is obtained as a whole.

Figure 8:
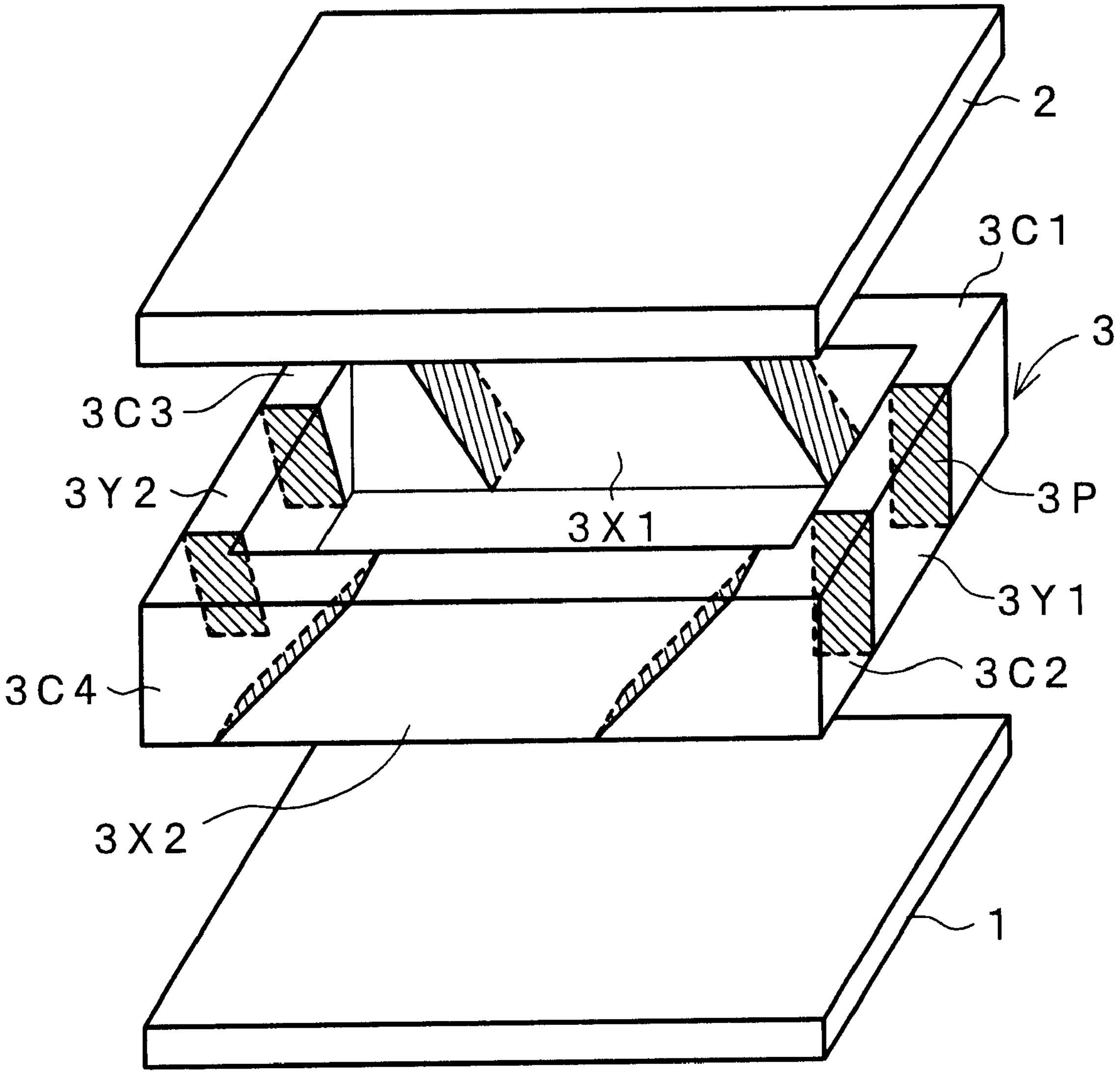
FIG. 8 is an explanatory view of the fourth embodiment of the display device according to the present invention.
Figures 9A, 9B:
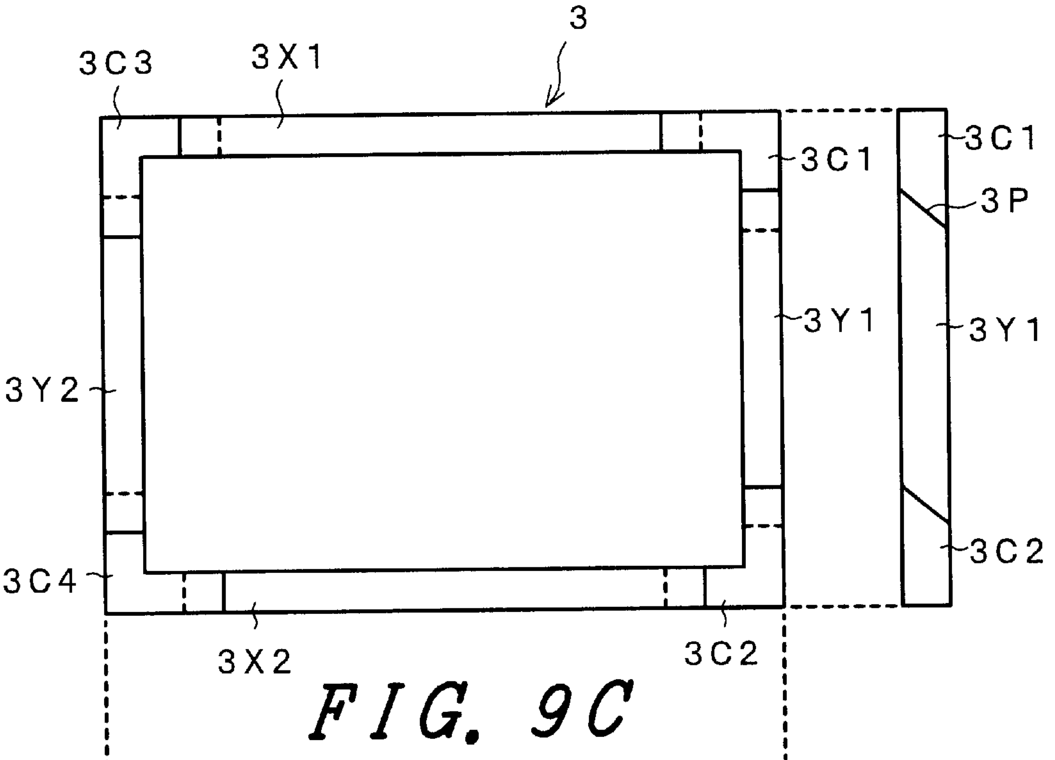
Figure 9C:
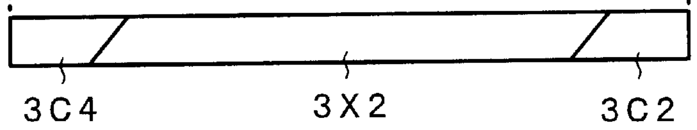

FIG. 8 is an explanatory view of the fourth embodiment of the display device according to the present invention. Further, FIG. 9A to FIG. 9C are trihedral views showing a plan and two sides of an outer frame in the fourth embodiment of the present invention, wherein FIG. 9A is a plan view, FIG. 9B is a short-side side view and FIG. 9C is a long-side side view.

In this embodiment, an outer frame 3 is divided into a plurality of wall members 3X1, 3X2, 3Y1, 3Y2 and 3C1 to 3C4 in the same manner as the outer frame 3 of the first embodiment shown in FIG. 1A to FIG. 1B. This embodiment differs from the first embodiment in the directions that oblique surfaces which are formed at both ends of the wall member are directed.

In the first embodiment, as shown in FIG. 1A, the wall members 3X1, 3X2, 3Y1 and 3Y2 respectively have oblique surfaces 3P at both ends thereof and both of these oblique surfaces 3P at both ends are formed of oblique surfaces which are directed toward the back surface panel 1. Here, the state that the oblique surfaces 3P are directed toward the back surface panel 1 means that surfaces of the oblique surfaces 3P face the back surface panel 1 in an opposed manner and does not face the front surface panel 2 in an opposed manner. Further, the wall members 3C1 to 3C4 which are engaged with these wall members 3X1, 3X2, 3Y1 and 3Y2 also respectively have oblique surfaces 3P at both ends thereof and both of oblique surfaces 3P at both ends are formed of oblique surfaces which are directed to the front surface panel 2. That is, both of oblique surfaces 3P formed at both ends of each wall member are formed of oblique surfaces which are directed in the same direction. In this case, when a force is applied between the back surface panel 1 and the front surface panel 2, there may be a case that the wall member 3C2 receives a force which pushes out the wall member 3C2 from the wall members 3X2 and 3Y1 in the oblique outward direction of the frame.

On the other hand, as shown in FIG. 8, this embodiment has the same constitution as the first embodiment with respect to a point that the wall members 3X1, 3X2, 3Y1, 3Y2 and 3C1 to 3C4 respectively have oblique surfaces 3P at both ends thereof. However, in this embodiment, one of the oblique surfaces at both ends is formed of an oblique surface which is directed to the front surface panel 2 and the other of the oblique surfaces at both ends is formed of an oblique surface which is directed toward the back surface panel 1. To take the wall member 3X2 as an example, the oblique surface 3P of the wall member 3X2 at the end portion which is engaged with the wall member 3C2 is formed of an oblique surface which is directed toward the back surface panel 1. On the other hand, the oblique surface 3P of the wall member 3X2 at the end portion which is engaged with the wall member 3C4 which is disposed opposite to the wall member 3X2 is formed of an oblique surface which is directed to the front surface panel 2. The same goes for other wall members. In this manner, in case that the oblique surfaces disposed at both ends of the wall member are formed of the oblique surfaces which are directed in the directions opposite to each other, when a force is applied between the back surface panel 1 and the front surface panel 2, the force which is applied to respective wall members is applied in the direction which turns around the frame. Accordingly, the force which pushes the wall member in the direction toward the outside of the frame becomes weak.

Since constitutions other than the above-mentioned point are substantially equal to the corresponding constitution of respective embodiments which have been explained heretofore and hence, the overlapped explanation is omitted. Here, this embodiment has been explained with respect to an embodiment in which the directions of the oblique surfaces of the first embodiment are made different from each other. However, the technical concept of the embodiment may be applied to the second embodiment and the third embodiment. Also in this case, the directions of the oblique surfaces at both ends of the wall member may be directed in directions opposite to each other.

Figure 10:
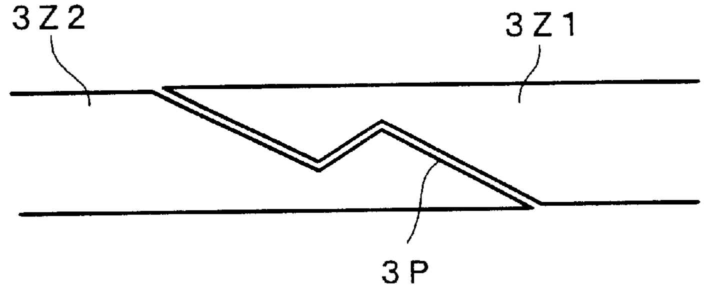
FIG. 10 is an explanatory view of the fifth embodiment of the display device according to the present invention.

FIG. 10 is an explanatory view of the fifth embodiment of the display device according to the present invention. This embodiment explains a modification of the shape of oblique surfaces 3P of wall members which is applicable to engaging portions of oblique surfaces 3P of respective embodiments which have been explained heretofore.

FIG. 10 is an enlarged view of an essential part in which the shape of the engaging portions of wall members 3Z1, 3Z2 used for forming an outer frame 3 is enlarged and the shape is viewed from the side as in the case of FIG. 2B and FIG. 2C. The wall members 3Z1, 3Z2 have oblique surfaces 3P similar to those of respective embodiments explained heretofore. With respect to the oblique surface portions which are engaged with each other, they have a shape in which a protrusion and a recess are engaged with each other at least at a portion thereof. Due to such a constitution, even when a force is applied from the back surface panel 1 or the front surface panel 2, the possibility that the wall members 3Z1, 3Z2 are displaced in the left-and-right direction in the drawing can be minimized.

Although the present invention has been explained heretofore in conjunction with respective embodiments, the present invention is not limited to these embodiments and various modifications are possible in a range without departing from the technical concept of the present invention. For example, the number of division and the dividing portions of the outer frame is not limited to those of the above-mentioned respective embodiments, and can be arbitrarily selected corresponding to the size of the display device. Further, it is not always necessary to form the oblique surfaces on all neighboring engaging portions. That is, to take respective sizes of the long sides and short sides into consideration, the oblique surfaces may be formed only at portions where there is a possibility of leaking of the inner pressure and other portions may be engaged with each other by abutting them each other or by forming shoulders or steps.

That is, when there are plurality of engaging portions, the present invention is not applied to all engaging portions and may be applied only to some engaging portions. Further, even with respect to one engaging portion, not only the whole engaging portion is formed of the oblique surface of the present invention but also only a portion of the engaging portion may be formed of the oblique surface of the present invention and other portion may be formed in a different shape.

As has been explained heretofore, according to the present invention, in the sealing step, the adhesive agent is coated on the oblique surface portions of the outer frame which are engaged with each other, the pressure is applied to the oblique surface portions in the directions toward the front surface panel and the back surface panel, and the outer frame is heated at a high temperature so as to melt the adhesive agent. In this case, since the crossing angle made by the normal line of the oblique surface and the normal line of the front surface panel or the back surface panel is set to an acute angle, the state that the pressure is applied to both oblique surface portions is obtained so that the adhesive agent which is interposed between the oblique surface portions can be easily extended over the entire area whereby the reliable sealing is obtained. Accordingly, the leaking of the inner pressure hardly occurs so that the air-tightness of the sealed space can be maintained.

Further, when the sealed space is set at a pressure lower than that of the external atmosphere or a vacuum is produced in the sealed space, since both engaging oblique surfaces respectively receive the pressure from the back surface panel side and the front surface panel side, the leaking of the inner pressure hardly occurs at the engaging portions so that the air-tightness of the sealed space can be maintained.

Further, since the outer frame is constituted of a plurality of wall members, there is no waste in cutting the material used for forming the outer frame so that the display device can be obtained in an inexpensive manner as a whole.

What is claimed is:

1. A display device comprising a front surface panel, a back surface panel and an outer frame, wherein the front surface panel, the back surface panel and the outer frame are fixedly secured to each other by an adhesive agent, and a sealed space formed in the inside of the display device which is surrounded by the front surface panel, the back surface panel and the outer frame is set at a pressure lower than the outside pressure, the improvement being characterized in that the outer frame is comprised of a plurality of wall members and portions of at least some neighboring wall members which are engaged with each other have oblique surfaces at least partially, a crossing angle made by a normal line of the oblique surfaces and a normal line of the front surface panel or the back surface panel is set to an acute angle, and both oblique surface portions which are engaged with each other are fixedly secured to each other by way of the adhesive agent.

2. A display device according to claim 1, wherein the adhesive agent is protruded from an interface of the oblique portions which are engaged with each other.

3. A display device according to claim 1, wherein a vacuum is produced in the sealed space.

4. A display device according to claim 1, wherein the wall members are formed of material which is equal to material of the front surface panel or the back surface panel.

5. A display device according to claim 1, wherein the wall member is formed of glass material.

6. A display device according to claim 1, wherein the adhesive agent is formed of frit glass.

7. A display device according to claim 1, wherein the back surface panel includes field emission elements.

8. A display device according to claim 1, wherein a gap defined between the front surface panel and the back surface panel is set to not less than 1 mm.

9. A display device according to claim 1, wherein each wall member has the oblique surfaces at both ends thereof, one of the oblique surfaces at both ends is formed of an oblique surface which is directed toward the front surface panel and the other of the oblique surfaces at both ends is formed of an oblique surface which is directed to the back surface panel.

10. A display device according to claim 1, wherein each wall member has the oblique surfaces at both ends thereof and both oblique surfaces at both ends are formed of oblique surfaces which are directed to the front surface panel or both oblique surfaces at both ends are formed of oblique surfaces which are directed to the back surface panel.

11. A display device according to claim 1, wherein both oblique surface portions which are engaged with each other have a recess and a protrusion which are engaged with each other at least at a portion of the oblique surface portions.

* * * * *